US010011159B1

(12) United States Patent
Salter et al.

(10) Patent No.: US 10,011,159 B1
(45) Date of Patent: Jul. 3, 2018

(54) SLIDING VEHICLE WINDOW HAVING MINIMAL PERIMETER SEAL

(71) Applicant: Ford Global Technologies, LLC, Dearborn, MI (US)

(72) Inventors: Stuart C. Salter, White Lake, MI (US); Chester Stanislaus Walawender, Livonia, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/396,865

(22) Filed: Jan. 3, 2017

(51) Int. Cl.
| | | |
|---|---|---|
| *B60J 10/79* | (2016.01) | |
| *E05D 15/06* | (2006.01) | |
| *B60J 1/18* | (2006.01) | |
| *B60J 10/15* | (2016.01) | |
| *B60J 1/00* | (2006.01) | |

(52) U.S. Cl.
CPC .............. *B60J 10/79* (2016.02); *B60J 1/008* (2013.01); *B60J 1/1853* (2013.01); *B60J 10/15* (2016.02); *E05D 15/0608* (2013.01)

(58) Field of Classification Search
CPC ........ B60J 1/008; B60J 1/1853; B60J 1/1838; B60J 1/1846
USPC .................................. 49/400, 413, 380, 209
See application file for complete search history.

(56) References Cited

U.S. PATENT DOCUMENTS

| | | | | |
|---|---|---|---|---|
| 532,043 | A | * 1/1895 | Fagan | ....................... E06B 3/44 |
| | | | | 49/209 |
| 4,607,457 | A | * 8/1986 | Shewchuk | ............ E06B 7/2301 |
| | | | | 49/400 |
| 4,850,139 | A | 7/1989 | Tiesler | |
| 4,988,142 | A | * 1/1991 | Chandler | ............... B60J 5/0402 |
| | | | | 296/146.2 |

(Continued)

FOREIGN PATENT DOCUMENTS

| | | | | |
|---|---|---|---|---|
| FR | 2839020 | A1 * 10/2003 | .............. | B60J 1/008 |
| FR | 2839020 | A1 * 10/2003 | .............. | B60J 1/008 |
| JP | 2001253236 | A * 9/2001 | .............. | B60J 1/008 |

OTHER PUBLICATIONS

Machine translation of FR2839020.*

(Continued)

*Primary Examiner* — Katherine W Mitchell
*Assistant Examiner* — Marcus Menezes
(74) *Attorney, Agent, or Firm* — Jason Rogers; Price Heneveld LLP

(57) ABSTRACT

A vehicle includes a window having an internal opening defined by an angled edge forming a clear space generally shaped as a truncated pyramid. An operable window panel is slidable relative to the internal opening to define open and closed positions. A compressible elastic sealing member is disposed along the angled edge, wherein the sealing member defines a substantially convex profile when the operable window panel in the open position. A guide assembly is positioned adjacent an interior surface of the window and adapted to guide the operable window panel between the (Continued)

open and closed positions. The closed position is defined by an outer surface of the operable window panel being co-planar with an exterior surface of the window. The closed position is further characterized by the sealing member being deformed to occupy at least the seam defined between the window and the operable window panel.

14 Claims, 6 Drawing Sheets

(56) References Cited

U.S. PATENT DOCUMENTS

| | | | |
|---|---|---|---|
| 5,154,028 A * | 10/1992 | Hill | B60J 10/248 296/201 |
| 5,454,193 A | 10/1995 | Hrifko | |
| 5,505,023 A * | 4/1996 | Gillen | B60J 1/1853 49/209 |
| 5,613,323 A * | 3/1997 | Buening | B60J 1/16 49/130 |
| 5,786,067 A * | 7/1998 | Gold | B29C 43/021 156/196 |
| 5,799,444 A * | 9/1998 | Freimark | B60J 1/1853 49/209 |
| 6,551,673 B1 * | 4/2003 | Yamamoto | B60J 1/008 296/146.15 |
| 6,555,202 B2 | 4/2003 | Shukuri et al. | |
| 7,155,862 B2 * | 1/2007 | Bourque | B60J 1/1853 49/209 |
| 7,155,863 B2 * | 1/2007 | Daniel | B60J 1/1853 292/DIG. 6 |
| RE41,502 E * | 8/2010 | Neaux | B60J 1/14 296/84.1 |
| 7,934,342 B2 * | 5/2011 | Lahnala | B60J 1/1853 49/380 |
| 8,246,101 B2 | 8/2012 | Cicala | |
| 8,413,393 B2 * | 4/2013 | Melesky | E04H 9/16 51/199 |
| 2002/0148163 A1 * | 10/2002 | Warner | E05D 15/0652 49/209 |
| 2006/0107599 A1 * | 5/2006 | Luten | B60J 1/1853 49/413 |
| 2008/0216410 A1 * | 9/2008 | Lahnala | B60J 1/1853 49/374 |
| 2016/0250825 A1 * | 9/2016 | Cleary | B32B 17/10761 428/215 |

OTHER PUBLICATIONS

AZ Trucks.Com, "High Performance Sliding Window," www.aztrucks.com/product_application.asp?id=1488999, Oct. 21, 2016, two pages.

* cited by examiner

US 10,011,159 B1

SLIDING VEHICLE WINDOW HAVING MINIMAL PERIMETER SEAL

FIELD OF THE INVENTION

The present invention generally relates to vehicle windows, and more specifically, sliding rear windows for pick-up trucks having a minimal perimeter seal for hiding the seam when the window is in the closed position.

BACKGROUND OF THE INVENTION

Conventional pick-up truck-type vehicles include a rear window that is slidably operable between open and closed positions. This window is typically offset toward the passenger cabin. A seal assembly between the sliding panel and the rear window fills this gap between the offset panel and the window.

SUMMARY OF THE INVENTION

According to one aspect of the present invention, a vehicle includes a window having an internal opening defined by an angled edge that forms a clear space generally in the shape of a truncated pyramid. An operable window panel is selectively slidable relative to the internal opening to define open and closed positions. A compressible elastic sealing member is disposed along the angled edge, wherein the compressible sealing member defines a substantially convex profile when the operable window panel in the open position. A guide assembly is positioned adjacent an interior surface of the window and adapted to guide the operable window panel between the open and closed positions. The closed position is defined by an outer surface of the operable window panel being co-planar with an exterior surface of the window. The closed position is further characterized by the compressible sealing member being deformed to occupy at least the seam defined between the window and the operable window panel.

According to another aspect of the present invention, a vehicular sliding window assembly includes a window having a central opening defined by a concave edge having a compressible sealing member seated therein. An operable panel is selectively slidable with respect to the window to define open and closed positions. The closed position is characterized by the operable panel being within the central opening and co-planar with the window and the compressible sealing member occupying a gap defined therebetween.

According to another aspect of the present invention, a vehicular sliding window assembly includes a window having an internal opening. An operable panel is selectively slidable with respect to the window to define at least a closed position characterized by the operable panel being co-planar with the window and the window and operable panel defining a non-perpendicular seam extending therebetween with a compressible elastic seal member occupying the seam.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
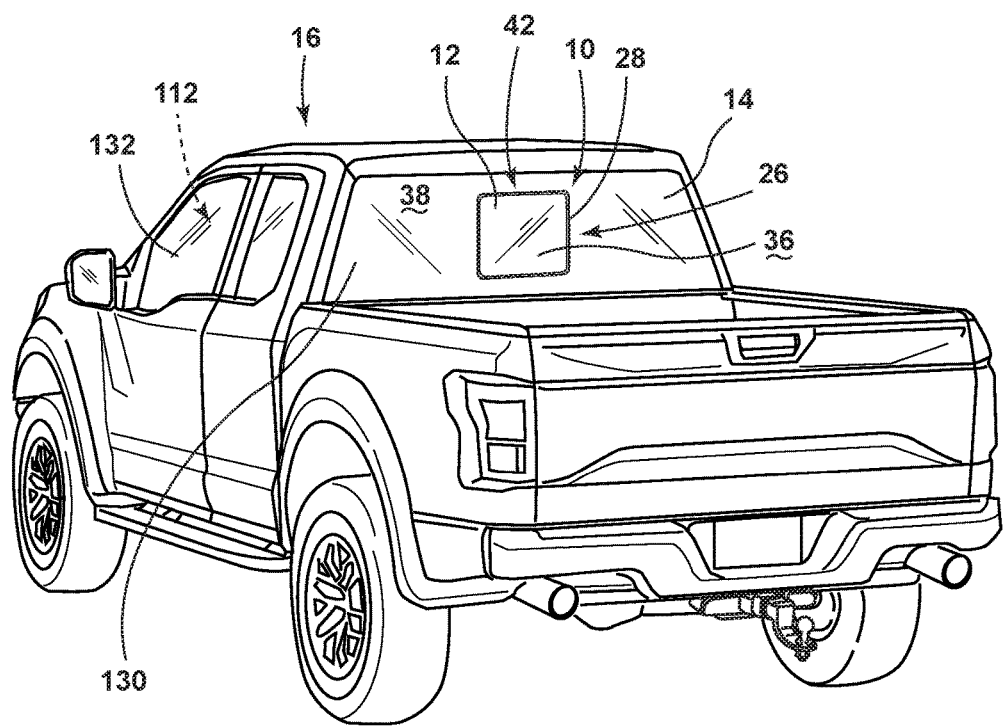
FIG. 1 is a rear perspective view of a pick-up truck incorporating an aspect of the minimal seal extending between the rear window and an interior operable panel.
Figure 2:
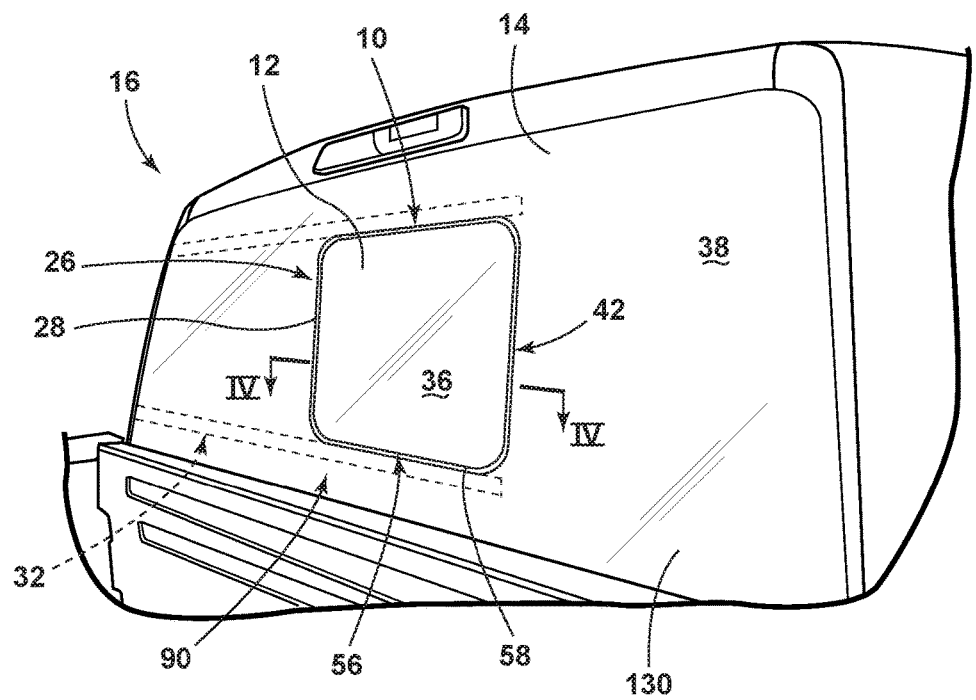
FIG. 2 is an enlarged perspective view of the rear window showing the operable window panel in a closed position.
Figure 3:
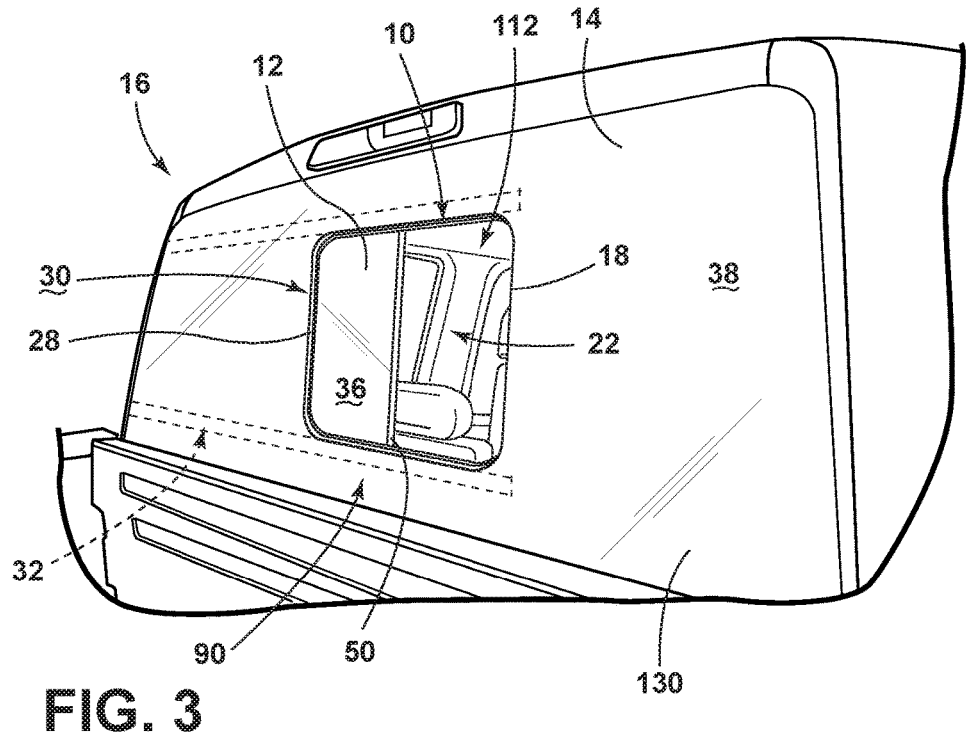
FIG. 3 is a rear perspective view of the window of FIG. 2, with the window moved to an open position.
Figure 4:
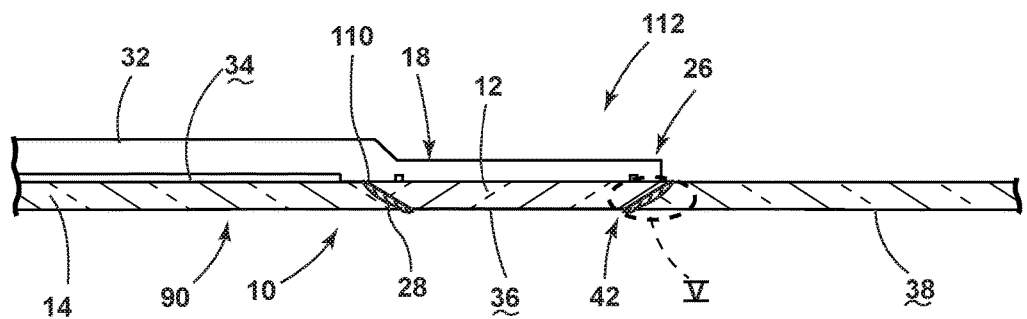
FIG. 4 is a cross-sectional view of the rear window of FIG. 2, taken along IV-IV.
Figure 5:
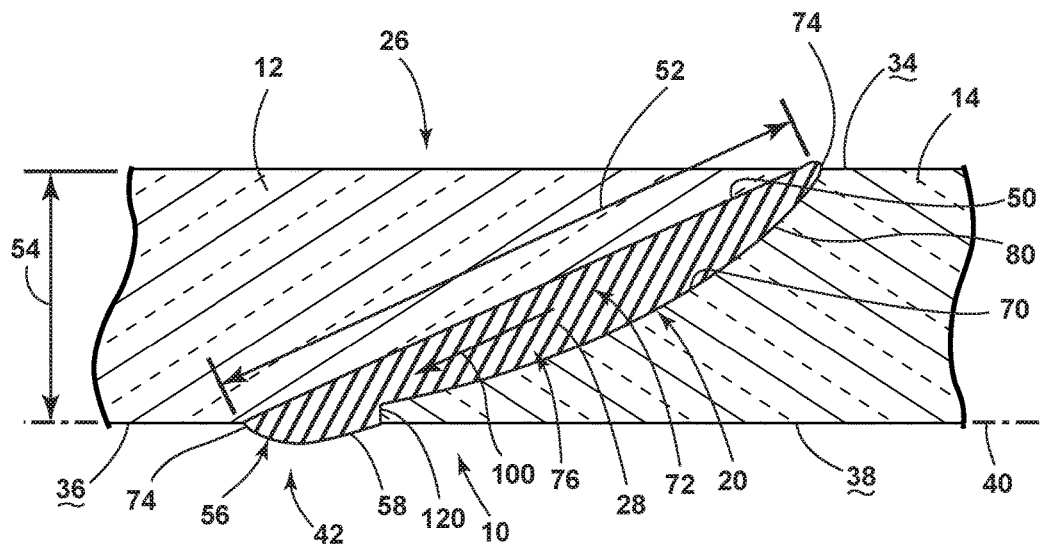
FIG. 5 is an enlarged cross-sectional view of the rear window of FIG. 4, taken at area V.
Figure 6:
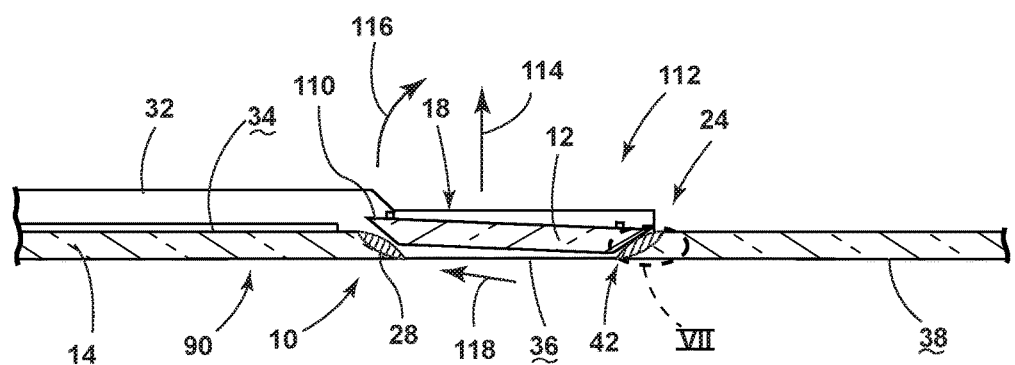
FIG. 6 is a cross-sectional view of an aspect of a rear window incorporating the minimal perimeter seal, and illustrating the window in a partially open position.
Figure 7:
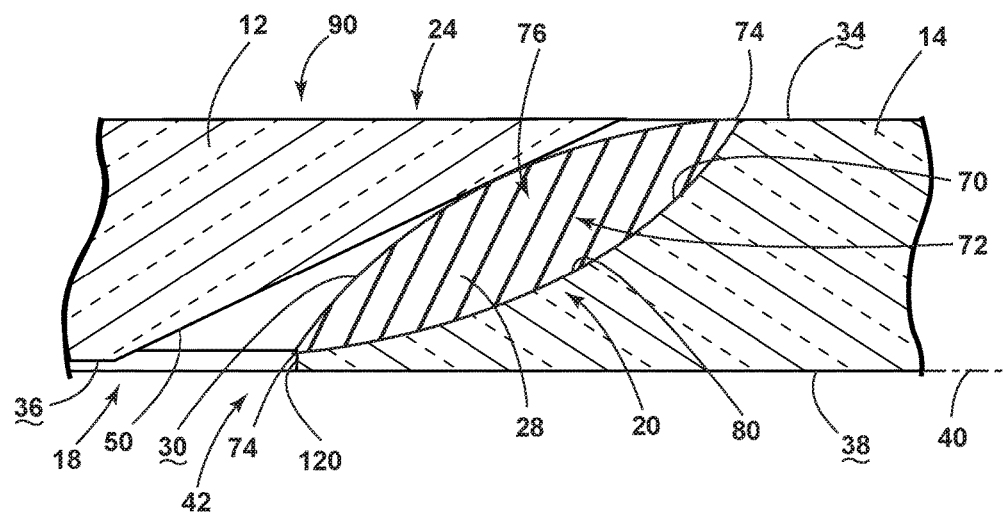
FIG. 7 is an enlarged cross-sectional view of the window of FIG. 6, taken at area VII.
Figure 8:
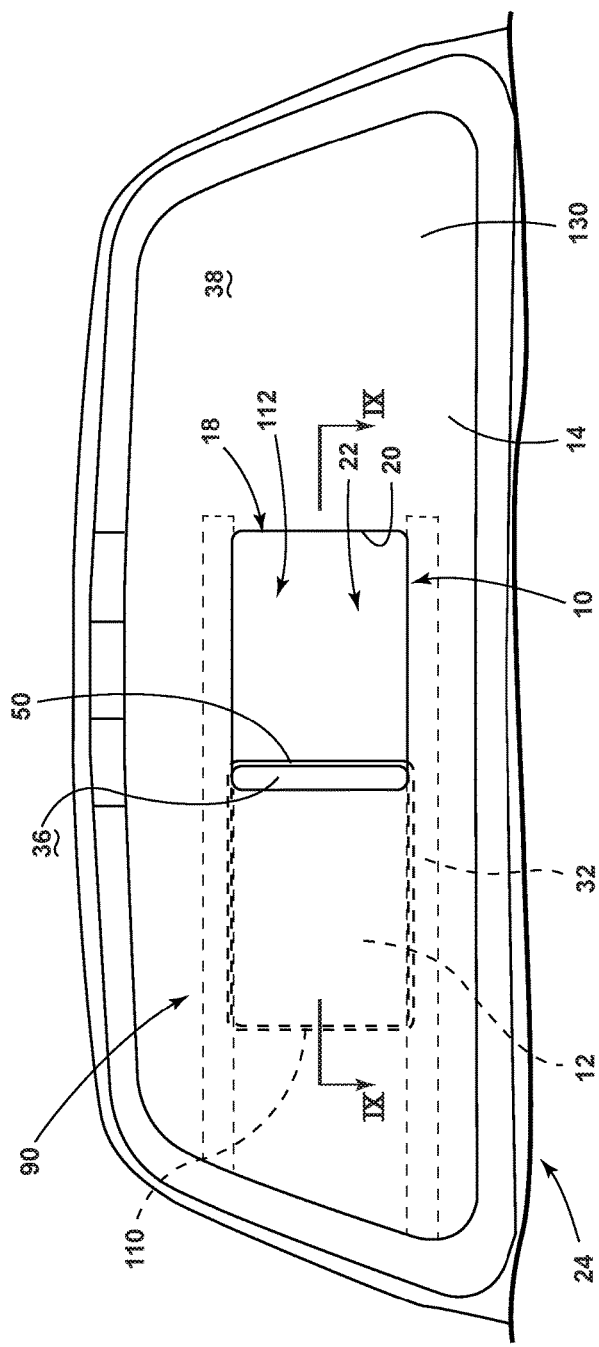
FIG. 8 is a rear elevational view of a rear window incorporating the minimal perimeter seal and showing the operable window panel in an open position.
Figure 9:
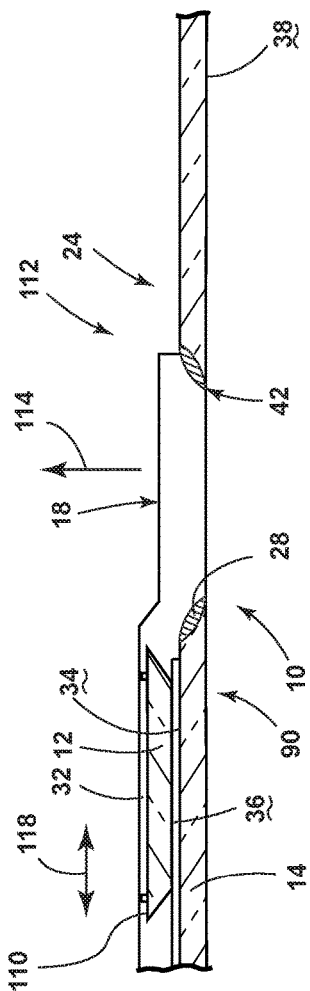
FIG. 9 is a cross-sectional view of the window of FIG. 8 taken along line IX-IX.
Figure 10:
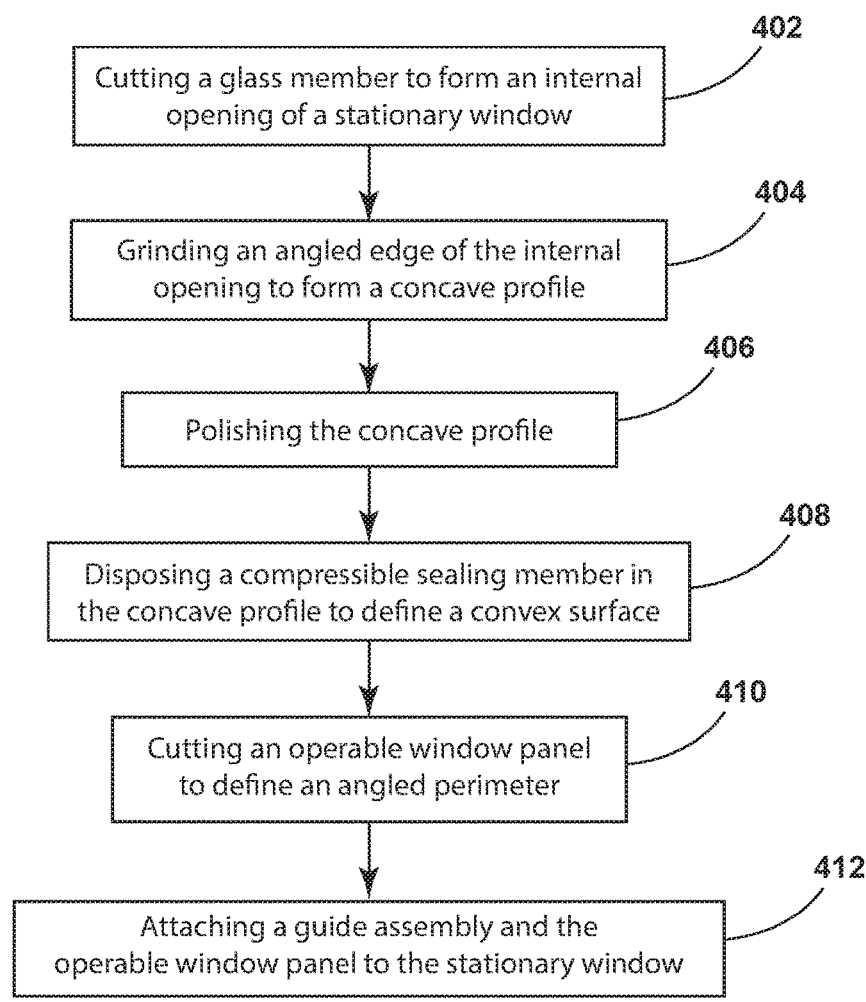
FIG. 10 is a schematic flow diagram illustrating a method for forming a rear window assembly for a vehicle.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-9, reference numeral 10 generally refers to a minimal perimeter seal used to seal the engagement between an operable window panel 12 and a stationary window 14 for a vehicle 16. According to the various embodiments, the vehicle 16 can include a window, typically a stationary window 14, having an internal opening 18 defined by an angled edge 20 that forms a clear space 22 or opening generally in the shape of a truncated pyramid. The operable window panel 12 is selectively slidable relative to the internal opening 18 to define open and closed positions 24, 26. A compressible elastic sealing member 28 is disposed along the angled edge 20 to define the minimal perimeter seal 10. The compressible sealing member 28 defines a substantially convex surface 30 when the operable window panel 12 is in the open position 24. A guide assembly 32 is positioned adjacent an interior surface 34 of the stationary window 14 and is adapted to guide the operable window panel 12 between the open and closed positions 24, 26. The closed position 26 of the operable window panel 12 is defined by an outer surface 36 of the operable window panel 12 defining a vertical plane 40 that is coplanar with an exterior surface 38 of the stationary window 14. The closed position 26 is further characterized by the compressible sealing member 28 being deformed to occupy at least the seam 42 defined between the stationary window 14 and operable window panel 12.

Referring again to FIGS. 1-9, the seam 42 between the stationary window 14 and the operable window panel 12 is defined by an overlapping relationship between the angled edge 20 of the window and an angled perimeter 50 of the operable window panel 12. In this manner, the cross-sectional surface width 52 of the seam 42 is greater than the perpendicular cross-sectional thickness 54 of the stationary window 14 and the window panel 12. This configuration can allow for greater sealing strength to prevent leaks in the seam 42 defined between the operable window panel 12 and the stationary window 14 when the operable window panel 12 is in the closed position 26. Additionally, when the operable window panel 12 is in a closed position 26, the closed position 26 is further defined by at least a deflected portion 56 of the compressible sealing member 28 extending outward and proud of the outer and exterior surfaces 36, 38 of the operable window panel 12 and the stationary window 14, respectively, and the seam 42. In this manner, when the operable window panel 12 is moved to the closed position 26, the angled perimeter 50 of the operable window panel 12 compresses against the compressible elastic sealing member 28 to deform the compressible elastic sealing member 28 to fully occupy the seam 42 defined between the operable window panel 12 and the stationary window 14. Through this deformation, deflected portions 56 of the compressible elastic sealing member 28 can extend outward from the seam 42 to define an at least partial projection 58 of the compressible elastic sealing member 28 away from the exterior surface 38 of the stationary window 14 and the outer surface 36 of the operable window panel 12.

Referring again to FIGS. 1-9, in order to maintain a position of the compressible elastic sealing member 28, the angled edge 20 of the stationary window 14 includes a generally concave profile 70. It is contemplated that the compressible elastic sealing member 28 is seated within the concave profile 70 of the angled edge 20 of the stationary window 14. This concave profile 70 provides a greater surface area for attaching the compressible elastic sealing member 28 to the stationary window 14. Additionally, this concave profile 70 allows for a more controlled elastic deformation of the compressible sealing member 28 as the operable window panel 12 moves in the closed position 26. Further, compressible elastic sealing member 28, when seated in the concave profile 70 of the angled edge 20 of the stationary window 14, includes a thicker cross-sectional profile within the middle 72 of the seam 42 and a much thinner cross-sectional profile toward the outer edges 74 of the seam 42. Accordingly, the outer edges 74 of the seam 42 become less visible when the operable window panel 12 is in the closed position 26. Accordingly, when the operable window panel 12 is moved in the closed position 26, the angled perimeter 50 of the operable window panel 12 is positioned relatively close to the concave profile 70 of the stationary window 14. The enlarged space 76 defined therebetween, defining the middle 72 of the seam 42, is occupied by the compressible elastic sealing member 28. Due to the concave profile 70 of the angled edge 20, a substantial portion of the compressible elastic sealing member 28 remains in the middle 72 of the seam 42 and minimal deflected portions 56 of the compressible elastic sealing member 28 move toward the outer edges 74 of the seam 42 to maintain a substantially hidden and substantially invisible appearance of the seam 42 and the sealing member 28 when viewed from the exterior of the vehicle 16. This, in turn, gives the appearance of a single vertical plane 40 of the stationary window 14 that has the effect of concealing the seam 42.

In order to further hide the appearance of the compressible elastic sealing member 28, it is contemplated that the compressible elastic sealing member 28 can be an at least partially translucent or substantially transparent silicone gasket. It is contemplated that other materials can be used for the compressible elastic sealing member 28 that have a substantially clear and/or translucent property and have the elastic and compressible properties similar to that of silicone. It is also contemplated that the compressible sealing member 28 can be disposed on the operable window panel 12 rather than the stationary window 14. In such an embodiment, the concave profile 70 can be defined within the angled perimeter 50 to provide a seat 80 for the compressible sealing member 28.

Referring again to FIGS. 1-9, the angled perimeter 50 of the operable window panel 12 also defines a generally truncated pyramid shape such that the angled perimeter 50 is able to seat within the truncated pyramid shape defined by the angled edge 20 of the internal opening 18 for the stationary window 14. This configuration allows for the seam 42 to be defined by the generally overlapping relationship between the angled edge 20 of the window and the angled perimeter 50 of the operable window panel 12. This configuration also provides for the flush or at least substantially flush configuration of the outer surface 36 of the operable window panel 12 and the exterior surface 38 of the stationary window 14 when the operable window panel 12 is in the closed position 26.

Referring again to FIGS. 1-9, the stationary window 14, operable window panel 12, compressible elastic sealing member 28 and guide assembly 32 can define a sliding window assembly 90 that can be disposed within a stationary window 14 of the vehicle 16. This sliding window assembly 90 can include a stationary window 14 having a centrally positioned, typically internal opening 18 that is defined by the concave profile 70. As discussed above, a compressible sealing member 28 can be seated within the concave profile 70 of the internal opening 18. The operable window panel 12 is selectively slidable with respect to the stationary window 14 to define open and closed positions 24, 26. The closed position 26 of the operable window panel 12 is characterized by the operable window panel 12 being within the internal opening 18 and being coplanar with the stationary window 14. In this closed position 26, the compressible sealing member 28 also occupies a gap or seam 42 defined therebetween. As discussed above, the closed position 26 of the operable window panel 12 defines an engagement between the angled perimeter 50 of the operable window panel 12 and the compressible sealing member 28 of the internal opening 18. This engagement serves to compress and elastically deform the compressible sealing member 28 such that a deflected portion 56 of the compressible sealing member 28 extends outward from the seam 42 defined between the operable window panel 12 and the stationary window 14.

As discussed above, the compressible sealing member 28, when the operable window panel 12 is in the open position 24, defines a convex surface 30 at the internal opening 18. This convex surface 30 encourages proper sealing between the operable window panel 12 and the stationary window 14. Additionally, the concave profile 70 defined by the internal opening 18 provides a substantial seat 80 for containing the convex surface 30 of the compressible sealing member 28. This convex surface 30 also provides a cushion effect as the operable window panel 12 moves into the closed position 26. This convex surface 30, in conjunction with the angled perimeter 50 of the operable window panel 12 causes a deformation of the compressible sealing member 28 generally in the direction of the exterior of the vehicle 16. This directed deformation 100 of the compressible sealing member 28 helps to promote minimal movement of the compressible sealing member 28 in an inward direction and toward the passenger cabin 112. This ensures that the sealing member 28 will be substantially flush with the operable panel and stationary window 14 or will be minimally proud of these coplanar surfaces when the operable window panel 12 is in the closed position 26.

According to the various embodiments, it is contemplated that the stationary window 14 and the operable window panel 12 can be made of ion-exchanged glass, typically referred to as "gorilla" glass. In using this type of glass, the window assembly becomes stronger and more resistant to various impacts. In forming the angled edge 20 of the stationary window 14 and the concave profile 70 defined within the angled edge 20, the edges can be cut at an angle by a water jet. In order to achieve the concave profile 70 of the angled edge 20, a grinding and polishing operation can also be conducted in order to create a less visible edge around the internal opening 18. This configuration provides a rear window assembly within a vehicle 16 that substantially hides a frame or seal and improves craftsmanship in the flush appearance between the stationary window 14 and the operable window panel 12 when the operable window panel 12 is in the closed position 26. Additionally, the glazing for the stationary window 14 and the operable window panel 12 are generally thicker, which allows the seam 42 to be angled and provides additional sealing of the surface due to the additional surface area defined between the angled configuration of the operable window panel 12 in the stationary window 14. As discussed above, the concave profile 70 of the angled edge 20 is achieved through various grinding and polishing operations. These processes provide a more precise surface and the polishing helps the edges of the stationary window 14 and the operable window panel 12 at the seam 42 to be invisible while preventing chipping of the thinned surface that exists proximate the seam 42.

According to the various embodiments, the incorporation of ion-exchanged glass provides for a stronger window material. The ion exchange process is a chemical strengthening process where large ions are "stuffed" into a glass surface, creating a state of compression within the material of the glass. The ion-exchanged glass is specifically designed to maximize this behavior. To form the ion-exchanged glass, a typical glass member is placed in a hot bath of molten salt at a temperature of approximately 400° C. Smaller sodium ions leave the glass, and larger potassium ions from the salt bath replace the expelled sodium ions. These larger potassium ions take up more space within the glass and are pressed together while in the salt bath. When the glass cools, the larger ions produce a layer of compressive stress on the surface of the glass. Ion exchanged glass composition allows the potassium ion to diffuse far into the surface, creating high compressive stress deep into the glass. This layer of compression creates the surface that is more resistant to damage.

Referring again to FIGS. 4-9, in operation, the operable window panel 12 in the closed position 26 is flush with the stationary window 14 surrounding the operable window panel 12. As the operable window panel 12 moves to the open position 24, a leading edge 110 of the operable window panel 12 is translated inward and into the passenger cabin 112 of the vehicle 16. This inward movement 114 is assisted through the angled configuration of the stationary window 14 and operable window panel 12 at the seam 42. This generally rotational movement 116 of the operable window panel 12 and sliding lateral movement 118 of the operable window panel 12 serves to disengage the angled perimeter 50 of the operable window panel 12 from the compressible sealing member 28. Once disengaged, the operable window panel 12 can move slidably in a lateral movement 118 along the guide assembly 32 and move behind a portion of the interior surface 34 of the stationary window 14.

Referring again to FIGS. 4-9, when the operable window panel 12 is moved back to the closed position 26, an opposite sliding lateral movement 118 toward the central or interior opening is achieved and the operable window panel 12 performs a combination lateral movement 118 and rotational movement 116 through the guide assembly 32. This combined sliding, lateral movement 118 and rotational movement 116 translates the operable window panel 12 into the interior opening such that the outer surface 36 of the operable window panel 12 can be positioned flush with the exterior surface 38 of the stationary window 14 along the common vertical plane 40. As the operable window panel 12 moves into the closed position 26, the engagement with the angled perimeter 50 of the operable window panel 12 against the compressible sealing member 28 generates the directional deformation of the compressible sealing member 28 toward an exterior outer edge 74 of the seam 42. In this manner, a portion of the compressible sealing member 28 stands proud of the exterior outer edge 74 of the seam 42 to provide additional sealing functionality to substantially prevent leaks when the operable window panel 12 is in the closed position 26. The substantially transparent or substantially translucent configuration of the compressible sealing members 28 allows for the seam 42 to be substantially hidden when the operable window panel 12 is in the closed position 26.

Referring again to FIGS. 1-9, the sliding window assembly 90 for the vehicle 16 can include the stationary window 14 having the internal opening 18. The operable window panel 12 is selectively slidable with respect to the stationary window 14 to define at least a closed position 26 characterized by the operable window panel 12 being coplanar with the stationary window 14. The closed position 26 is further characterized by the stationary window 14 and operable panel defining an angled and non-perpendicular seam 42 extending therebetween with a compressible elastic seal member occupying the seam 42. As discussed above, the operable window panel 12 is slidably operable from the closed position 26 to an open position 24 that is characterized by the operable window panel 12 being distal from the internal opening 18. A compressible elastic sealing member 28 defines a convex surface 30 of the internal opening 18 is in the open position 24. Due to the convex surface 30 of the sealing member 28 and the concave profile 70 of the angled edge 20, the compressible elastic sealing member 28 is seated within the concave configuration of the angled edge 20 of the stationary window 14. This compressible elastic sealing member 28 can be a pre-formed seal that is installed at the concave profile 70 of the internal opening 18. This compressible elastic sealing member 28 can also be an elastic bead that is disposed directly on the concave profile 70 of the angled edge 20.

Referring now to FIGS. 1-10, having described various aspects of the sliding window assembly 90, a method 400 is disclosed for forming an aspect of the sliding window assembly 90. According to the method 400, a piece of ion exchanged glass, in the form of the stationary window 14 is cut to define an internal opening 18 (step 402). This cut is made at an angle to define the angled edge 20 of the internal opening 18 of the stationary window 14. The angled opening is then ground to define a generally concave profile 70 within the angled edge 20 (step 404). This ground concave profile 70 is then polished to strengthen this concave profile 70 and also to minimize cracks and chips within the glass (step 406). It is contemplated that the concave profile 70 can include a thickened edge 120 that is positioned proximate the exterior surface 38 of the stationary window 14. This thickened edge 120 provides a more robust portion of the seam 42 proximate the internal opening 18. This thickened portion also serves to minimize the occurrence of chips and cracks that might occur during operation of the vehicle 16. Once the concave profile 70 is generated, the compressible elastic sealing member 28 is applied to the seat 80 formed by the concave profile 70 of this angled edge 20 (step 408). As discussed above, the compressible elastic sealing member 28, once disposed in the concave profile 70 of the angled edge 20 serves to generate a generally convex surface 30 where a thickened portion of the compressible elastic seal is positioned within a middle 72 of the angled edge 20.

Referring again to FIGS. 1-10, according to the method 400, the operable window panel 12 can also be cut to include the angled perimeter 50 (step 410). This cut, as well as the initial cut of the stationary window 14, can be achieved through a fluid jet cutting mechanism. Once the operable window panel 12 is formed, the guide assembly 32 and the operable window panel 12 can be attached to the stationary window 14 (step 412).

As discussed above, the sliding window assembly 90 achieves a minimally visible seam 42 when viewed from the exterior of the vehicle 16 that provides a unique aesthetic that can appear to show the absence of a seam 42 and the operable window panel 12. Only when the operable window panel 12 is moved away from the closed position 26 is the operable window panel 12 more readily visible to a bystander exterior of a vehicle 16. This minimal perimeter seal 10 also decreases the occurrence of leaks through the use of the compressible elastic sealing member 28 that occupies and, in some instances, stands proud of the seam 42 at exterior portions of the sliding window assembly 90.

According to the various embodiments, the sliding window assembly 90 can be incorporated within various window assemblies for various vehicles 16. Such window assemblies can include, but are not limited to, rear windows 130, side windows 132, sunroofs, moonroofs, combinations thereof and other similar window assemblies.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:
   a window pane having an internal opening defined by an edge of the window pane having an angled surface that forms an open space generally in a shape of a truncated pyramid;
   an operable window panel selectively slidable relative to the internal opening to define open and closed positions;
   a compressible elastic sealing member fixedly disposed along the angled surface, wherein the compressible elastic sealing member defines a substantially convex profile when the operable window panel is in the open position; and
   a guide assembly positioned adjacent an interior surface of the window pane and adapted to guide the operable window panel between the open and closed positions, the closed position defined by an outer surface of the operable window panel being co-planar with an exterior surface of the window pane, the closed position further characterized by the compressible elastic sealing member being in direct contact with each of the window pane and the operable window panel and also deformed to occupy at least a seam defined between the window pane and the operable window panel.

2. The vehicle of claim 1, wherein the angled surface of the window pane includes a concave profile and wherein the compressible elastic sealing member is seated within the concave profile of the angled surface.

3. The vehicle of claim 1, wherein the seam is defined by an overlapping relationship between the angled surface of the window pane and an angled perimeter of the operable window panel.

4. The vehicle of claim 1, wherein the closed position is further characterized by at least a portion of the compressible elastic sealing member extending outward and proud of the seam.

5. The vehicle of claim 1, wherein at least one of the operable window panel and the window pane are made of ion-exchanged glass.

6. The vehicle of claim 1, wherein the compressible elastic sealing member is an at least partially translucent silicone gasket.

7. The vehicle of claim 1, wherein an angled perimeter of the operable window panel defines and seats within the shape of the truncated pyramid defined by the angled surface of the internal opening.

8. A vehicular sliding window assembly comprising:
   a window pane having a central opening defined by a concave edge having a compressible sealing member fixedly seated therein; and
   an operable glazing panel selectively slidable between open and closed positions, the closed position characterized by the operable glazing panel being within the central opening and co-planar with the window pane and the compressible sealing member directly engaging the window pane and the operable glazing panel, wherein an angled surface of the concave edge of the window pane is oriented at an angle such that the angled surface of the central opening defines a truncated pyramid.

9. The vehicular sliding window assembly of claim 8, wherein the compressible sealing member is an elastic member.

10. The vehicular sliding window assembly of claim 8, wherein the compressible sealing member, when the operable glazing panel is in the open position, defines a convex surface.

11. The vehicular sliding window assembly of claim 8, wherein the operable glazing panel defines an angled perimeter that seats within the angled surface of the central opening.

12. The vehicular sliding window assembly of claim 11, wherein the closed position defines engagement of the angled perimeter of the operable glazing panel and the compressible sealing member of the central opening that compresses and deforms the compressible sealing member such that a portion of the compressible sealing member extends outward from a seam defined between the operable glazing panel and the window pane.

13. The vehicular sliding window assembly of claim 8, wherein at least one of the operable glazing panel and the window pane are made of ion-exchanged glass.

14. The vehicular sliding window assembly of claim 8, wherein the compressible sealing member is an at least partially translucent silicone gasket.

\* \* \* \* \*